United States Patent
Jin (10) Patent No.: US 9,601,990 B2
(45) Date of Patent: Mar. 21, 2017

(54) HIGH EFFICIENCY PFC POWER CONVERTER

(71) Applicant: MICROSEMI CORPORATION, Aliso Viejo, CA (US)

(72) Inventor: Xiao Ping Jin, Orange, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 178 days.

(21) Appl. No.: 14/446,115

(22) Filed: Jul. 29, 2014

(65) Prior Publication Data

US 2015/0117062 A1    Apr. 30, 2015

Related U.S. Application Data

(60) Provisional application No. 61/896,263, filed on Oct. 28, 2013.

(51) Int. Cl.
| | |
|---|---|
| *H02M 1/42* | (2007.01) |
| *H02M 3/156* | (2006.01) |
| *H02M 3/335* | (2006.01) |
| *H02M 1/00* | (2006.01) |

(52) U.S. Cl.
CPC ..... *H02M 1/4241* (2013.01); *H02M 3/33592* (2013.01); *H02M 3/156* (2013.01); *H02M 3/33523* (2013.01); *H02M 3/33569* (2013.01); *H02M 2001/0009* (2013.01); *H02M 2001/0064* (2013.01); *Y02B 70/126* (2013.01); *Y02B 70/1475* (2013.01)

(58) Field of Classification Search
CPC ............. H02M 1/4208; H02M 1/4233; H02M 1/4241; H02M 3/156; H02M 3/33523; H02M 3/33569; H02M 3/33592; H02M 2001/0009; H02M 2001/0064
See application file for complete search history.

(56) References Cited

U.S. PATENT DOCUMENTS

| | | | |
|---|---|---|---|
| 4,441,146 | A | 4/1984 | Vinciarelli |
| 4,672,303 | A | 6/1987 | Newton |
| 4,758,941 | A | 7/1988 | Felton et al. |
| 4,864,479 | A | 9/1989 | Steigerwald et al. |
| 5,636,114 | A | 6/1997 | Bhagwat et al. |
| 5,909,362 | A | 6/1999 | Adams |
| 6,115,267 | A * | 9/2000 | Herbert ............... H02M 1/4258 363/132 |

(Continued)

OTHER PUBLICATIONS

Lu, Bing, et al., "Optimal Design Methodology for LLC Resonant Converter," Applied Power Electronics Conference and Exposition, 21st Annual IEEE, Mar. 19-23, 2006.

(Continued)

*Primary Examiner* — Matthew Nguyen
(74) *Attorney, Agent, or Firm* — Marger Johnson (57) ABSTRACT

A power factor correction (PFC) power converter is disclosed that converts AC input power to DC output power. A single stage of the PFC power converter performs both the DC-DC power conversion and the power factor correction for the power converter. The disclosed PFC power converters are efficient in energy conversion and have a power factor of 0.9-1.0. Further, the disclosed PFC power converters can be implemented in both low and high power applications above 75 W.

15 Claims, 6 Drawing Sheets

(56) References Cited

U.S. PATENT DOCUMENTS

| | | | |
|---|---|---|---|
| 6,118,673 A * | 9/2000 | Hua | H02M 1/4258 363/56.11 |
| 6,356,462 B1 | 3/2002 | Jang et al. | |
| 6,392,902 B1 | 5/2002 | Jang et al. | |
| 6,515,883 B2 * | 2/2003 | Wade | H02M 1/4208 323/222 |
| 6,788,033 B2 | 9/2004 | Vinciarelli | |
| 7,154,250 B2 | 12/2006 | Vinciarelli | |
| 8,115,460 B2 | 2/2012 | Kalechshtein | |
| 2004/0257272 A1 | 12/2004 | Jacobson | |
| 2007/0258271 A1 | 11/2007 | Meszlenyi | |
| 2010/0164400 A1 | 7/2010 | Adragna | |
| 2011/0292703 A1 * | 12/2011 | Cuk | H02M 1/4258 363/126 |
| 2012/0057372 A1 | 3/2012 | Reinberger et al. | |
| 2012/0274298 A1 | 11/2012 | Colbeck et al. | |
| 2012/0314457 A1 | 12/2012 | Reinberger et al. | |

OTHER PUBLICATIONS

Fairchild Semiconductor, "LED Application Design Guide Using Half-Bridge LLC Resonant Converter for 100W Street Lighting," AN-9729, Mar. 22, 2011 Fairchild Semiconductor Corporation, www.fairchildsemi.com.

Colorado State University, Simulation of a Series Half Bridge LLC Resonant Circuit, ECE562: Power Electronics I, Fall 2011, www.engr.colostate.edu/ECE562/labs/Lab9_LLC%20Resonance.pdf.

Infineon Technologies Asia Pacific, Design Guide for LLC Converter with ICE2HS01G, Application Note, Power Management & Supply, Singapore, ED Jul. 6, 2011.

http://www.ti.com/tool/ucc25600-design.calc, retrieved on Jun. 18, 2013.

Ding, Helen, "Design of Resonant Half-Bridge converter using IRS2795(1,2) Control IC," International Rectifier, El Segundo, California, Application Note AN-1160, downloaded Oct. 22, 2013, www.irf.com, pp. 1-32.

Fairchild Semiconductor, Half-Bridge LLC Resonant Converter Design Using FSFR-Series Fairchild Power Switch (FPS), AN-4151, 2007 Fairchild Semiconductor, Rev. 1.01. May 15, 2012, www.fairchildsemi.com, pp. 1-17.

Chandrasekhar, P., et al., "Design Consideration of LLC Resonant Converter for Electrolyser," International Journal on Electrical Engineering and Informatics, vol. 3, No. 3, 2011, pp. 278-291.

Microelectronics, AN2450 Application Note, "LLC resonant half-bridge converter design guideline," Rev. 5, Oct. 2007, www.st.com, pp. 1-32.

Fang, Xiang, et al., "An Optimal Design of the LLC Resonant Converter Based on Peak Gain Estimation," School of Electrical Engineering and Computer Science, University of Central Florida, Orlando, Florida, Twenty-Seventh Annual IEEE, Orlando, Florida, Feb. 5-9, 2012, pp. 1286-1291.

International Rectifier, "Resonant Half-Bridge Converter Control IC," IRS27951S IRS27952(4)S, Nov. 8, 2012, www.irf.com, pp. 1-28.

Fang, Yu, "Design of High Power Density LLC Resonant Converter with Extra Wide Input Range," Institute of Power Electronics, Zhejiang University, Hangzhou, China, IEEE, 2007, pp. 976-981.

Hu, Haibing, et al, "Optimal Design Considerations for a Modified LLC Converter with Wide Input Voltage Range Capability Suitable for PV Applications," School of Electrical Engineering and Computer Science, University of Central Florida, Orlando, Florida, IEEE 2011, pp. 3096-3103.

Khoobroo, Ehsan, et al., Optimal Design of LLC Series Resonant Converter with Enhanced Controllability Characteristic, Electrical Eng. Dept, Faculty of Engineering, Shahed University, Tehran, Iran, IEEE, 2012, pp. 392-396.

Yamadaya, Masayuki, et al., LLC Current-Resonant Control IC: [FA5760N], FET Innovating Energy Technology, Fuji, vol. 85, No. 6, 2012, pp. 445-451.

Bersani, Antonio, et al., DC/DC LLC Reference Design Using the dsPIC DSC, AN1336, Microchip Technology, Inc., 2010, pp. 1-82.

Choi, Hangseok, "Design Considerations for an LLC Resonant Converter," Fairchild Power Seminar 2007, Fairchild Semiconductor, Gyeonggi-do, Korea, pp. 1-29.

Adragna, C., "Designing LLC resonant converters for optimum efficiency," STMicroelectronics, Agrate Brianz, Italy, www.st.com, downloaded Mar. 13, 2010, IEEE Explore.

Liu, Ya, "High Efficiency Optimization of LLC Resonant Converter for Wide Load Range," Thesis Master of Science in Electrical Engineering, Virginia Polytechnic Institute and State University, Dec. 4, 2007, Blacksburg, Virginia, pp. i-xiii, 1-106.

Huang, Hong, "Designing an LLC Resonant Half-Bridge Power Converter," 2010 Texas Instruments Power Supply Design Seminar, SEM1900, Topic 3, 2010-2011 pp. 3-1-3-27.

Yu, Ruiyang, et al., Computer-Aided Design and Optimization of High-Efficiency LLC Series Resonant Converter, IEEE Transactions on Power Electronics, vol. 27, No. 7, Jul. 2012, pp. 3243.

EE Times Japan, Techno-Frontier 2011, ITMEDIA Inc. 2013, downloaded: http://eetimes.jp/ee/articles/1107/27/news074.html, Jul. 27, 2011, pp. 1-5.

Abdel-Rahman, Sam, "Resonant LLC Converter: Operation and Design 250W 33Vin 400Vout Design Example," Infineon Technologies, North America, Durham, North Carolina, Application Note AN2012-09 V1.0 Sep. 2012, pp. 1-19.

Power Integrations, PLC810PG HiperPLC Family, "Continuous Mode PFC & LLC Controller with Integrated Half-bridge Drivers," Power Integrations, San Jose, California, www.powerint.com, Aug. 2009, pp. 1-26.

Andreycak, Bill, "Zero Voltage Switching Resonant Power Conversion," Unitrode Corporation, Merrimack, New Hampshire, Application Note U-138, pp. 3-329-3-356, Texas Instruments Incorporated, 1999.

NXP Semiconductors, TEA Resonant power supply control IC with PFC, Product data sheet, TEA 1716T, Rev. 3-30 Nov. 20, 2012, pp. 1-47.

\* cited by examiner

HIGH EFFICIENCY PFC POWER CONVERTER

CROSS REFERENCE TO RELATED APPLICATIONS

This application claims the benefit of U.S. provisional patent application Ser. No. 61/896,263, filed Oct. 28, 2013, herein incorporated by reference.

FIELD OF THE INVENTION

This invention relates to power converters with power factor correction.

BACKGROUND OF THE INVENTION

In many countries, conventional offline power supply applications require a power factor correction (PFC) function for all applications exceeding 75 Watts. A separate PFC stage and isolated direct current (DC) to DC conversion stage are typically provided in such applications, especially when a safety isolation is also required. In some examples of low power systems, a fly back stage can be used to fulfill the function of both the PFC stage and the isolated DC to DC conversion stage. In such a PFC power converter, the charging current of the primary winding inductance is controlled at will, and therefore the peak current profile of the primary current and thus also the input current from the alternating current (AC) supply line can be controlled to follow a sine wave shape of the input voltage. The ability for the input current to track the sine wave shape of the input voltage creates a power factor of the power supply near unity or 1.

The low power systems having a fly back stage have some disadvantages. For example, they typically work in discontinuous current mode, which means that the transformer primary current has to be fully discharged or reset during each switching cycle before the turn-on of the power switch of the next cycle. The fly back stage exhibits a loss of the energy stored in the transformer's primary leakage inductance and additionally the operating current has a high crest factor, which causes the energy efficiency of the fly back stage to suffer. Therefore, PFC power converters with fly back stages are only practical in low power applications, normally below 60 W. The excessive power loss and associated heat generation of the PFC power converters with fly back stages are problematic in high power applications having a power rating above about 60 W.

Therefore, high efficiency PFC power converters having few or a single power processing stage(s) and a high conversion efficiency are welcome in the art. Further, high efficiency PFC power converters that are capable of an AC to DC conversion and are cost efficient would also be desirable in the art. These and other drawbacks of the current power converter technologies are addressed by the disclosed embodiments.

SUMMARY OF THE INVENTION

In one aspect, a PFC power converter has an input voltage supply, an input bridge stage, and a PFC bridge stage. The input voltage supply is configured to supply an input voltage that is received by the input bridge stage. The input bridge stage produces a rectified input bridge stage voltage that has a rectified sine waveform. The PFC bridge stage has a control circuit that is configured to sense the input bridge stage output current and cause the sensed input bridge stage output current waveform, $I_{PIN}$, to follow the rectified input bridge stage voltage waveform. The control circuit of the PFC bridge stage thus causes a power factor of the PFC power converter to be greater than 0.9.

In some other aspects, the PFC bridge stage of the PFC power converter operates in an LLC control mode. The PFC bridge stage can also have a first primary switch and a second primary switch that turn on and off alternatively within a certain switching frequency range. The voltage gain of the PFC bridge stage can be controlled by varying the switching frequency of the first and second switch. Further, the PFC power converter can include a transformer that has a primary winding and a secondary winding. The first primary switch and the second primary switch are electrically coupled to the primary winding.

In another embodiment, a first secondary switch and a second secondary switch also can be electrically coupled to the second winding of the transformer. The first and second secondary switches can be configured to turn on or off synchronously with the switching operation of the primary switches. In still other examples, the transformer also has a first output having a first voltage, a second output having a second voltage, and a boost switch that has a boost switch operating waveform and is electrically coupled to the secondary winding, the first output, and the second output. The boost switch also can be configured to turn on and off based on the first primary switch and the second primary switch turning on and off.

In still further aspects, the disclosed PFC power converters can include a transformer having a primary winding, a secondary winding, and a boost winding having a boost winding voltage. The PFC power converter also can have a boost capacitor and a rectifier. The boost capacitor is electrically coupled to an output of the input bridge stage and to an input of the PFC bridge stage. The rectifier is configured to rectify the boost winding voltage and charge the boost capacitor to a boost capacitor voltage.

The foregoing and other objects, features, and advantages of the invention will become more readily apparent from the following detailed description of embodiments of the invention, which proceeds with reference to the accompanying drawings.

DETAILED DESCRIPTION

In the drawings, which are not necessarily to scale, like or corresponding elements of the disclosed systems and methods are denoted by the same reference numerals.

Figure 1:
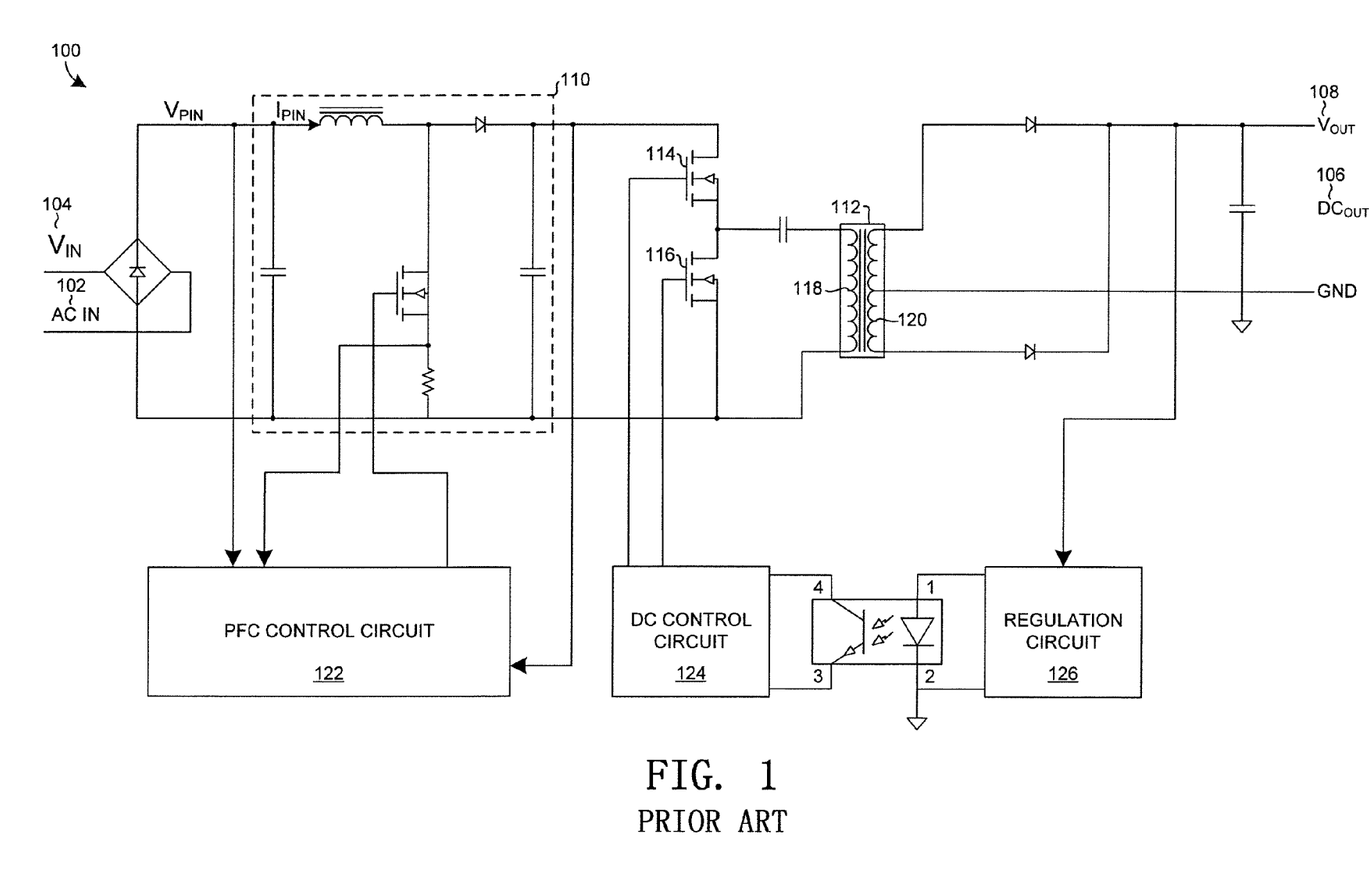
FIG. 1 is a schematic of a prior art PFC power converter.

The disclosed high efficiency PFC power converters reduce the power loss and associated heat generation compared to conventional approaches by providing fewer processing stages, which results in a high power conversion efficiency with a power factor of greater than 0.9. FIG. 1 shows a conventional PFC power converter 100 with an alternating current (AC) to direct current (DC) power conversion capability and a separate PFC stage 110. The PFC power converter 100 has an AC input 102, $AC_{IN}$, having an associated input voltage 104, $V_{IN}$, and a DC output 106, $DC_{OUT}$, having an associated output voltage 108, $V_{OUT}$. The PFC stage 110 performs the function of the power factor correction of the PFC power converter 100. The conventional PFC power converter 100 also has a transformer 112 and two switches, in this example two MOSFETs 114, 116. The transformer 112 has a primary winding 118 and a secondary winding 120. The combination of switches 114, 116 and transformer 112 perform DC/DC conversion.

The PFC stage 110 is separate from the DC/DC conversion capabilities of the PFC power converter 100 shown in FIG. 1 and is controlled by a PFC control circuit 122. The two MOSFETs 114, 116 are controlled by a DC control circuit 124. An output, or secondary winding side, of the transformer 112, associated with the secondary winding 112, is sensed by a regulation circuit 126 that is also electrically coupled to the DC control circuit 124 to provide a feedback loop, which helps regulate the input to the transformer 112 to produce the desired energy level on the output, or secondary winding side, of the transformer 112.

The PFC stage 110 controls the input current drawn from the AC input 102 to follow $V_{IN}$, thus ensuring a high power factor. Improvements to the conventional, multi-stage power conversion circuit architecture that is shown in FIG. 1 are disclosed in this application and can produce the same or similar power factors to the multi-stage PFC power converter circuit architecture shown in FIG. 1. Unfortunately, the need for two stages in the PFC power converter shown in FIG. 1, and particularly the need for a separate inductor in the PFC stage 110, adds to the overall cost and reduces the efficiency of the PFC power converter.

Figure 2A:
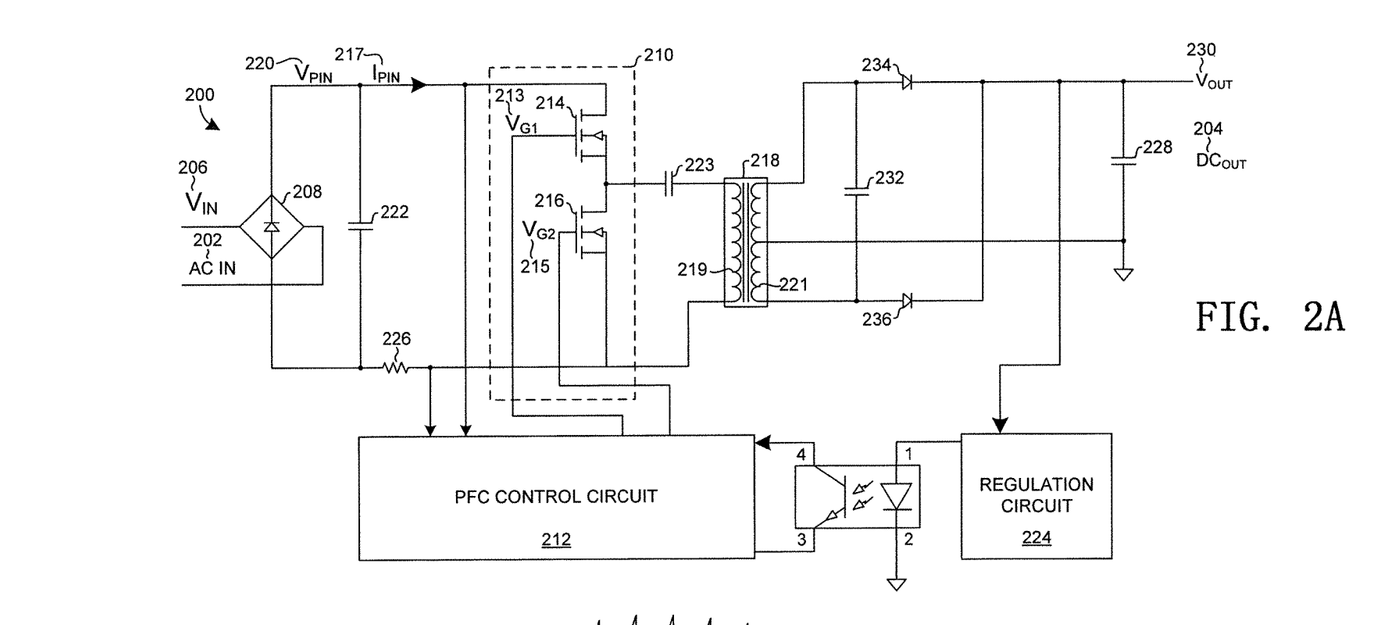
FIG. 2A is a schematic of an example high efficiency PFC power converter and FIG. 2B shows its associated operating waveforms, according to aspects of this disclosure.

Referring now to FIG. 2A, the disclosed high efficiency PFC power converter 200 performs both the DC/DC conversion (with the transformer 218) and the PFC capabilities with a single stage circuit architecture. The PFC power converter 200 is able to accomplish both the DC/DC conversion and the PFC capabilities by causing the waveform of a current, $I_{PIN}$ 217, that is received by a switching bridge stage 210 to follow the waveform of the power input 202 to the PFC converter 200. The switching bridge stage 210 also performs the DC/DC conversion in combination with a transformer 218, thereby reducing the number of stages required to perform the DC/DC conversion and the PFC capabilities from the conventional PFC power converters, as illustrated by the example shown in FIG. 1.

The PFC power converter 200 converts an AC input 202, $AC_{IN}$, to a DC output 204, $DC_{OUT}$. The $DC_{OUT}$ 204 of the PFC power converter 200 can be a voltage source or a current source, depending on the application needs. The output load can be electronic circuits or equipment, lighting devices, energy storage devices such as batteries and the like, super capacitors, or any other desirable output load.

The PFC power converter 200 of FIG. 2A has an input voltage supply associated with $AC_{IN}$ 202 that supplies an input voltage 206, $V_{IN}$, and an input bridge stage 208 that receives the input voltage 206 and produces a full wave rectified DC output 220, denoted $V_{PIN}$ 220. As discussed above, the PFC power converter 200 includes a switching bridge stage 210 that performs both the power factor correction for the PFC power converter 200 and the conversion of rectified DC output voltage, $V_{PIN}$ 220, to the desired output power, as described below. The switching bridge stage 210 has a PFC control circuit 212 that is configured to sense a switching bridge stage current flowing either into, or alternatively out of (a reflected current from the secondary side of the transformer, which is discussed in greater detail below), the switching bridge stage 210, denoted as $I_{PIN}$ 217, and to cause the sensed switching bridge stage input current waveform of $I_{PIN}$ 217 to follow the rectified input bridge stage voltage waveform, $V_{PIN}$ 220. A power factor of greater than 0.9 can be achieved with the PFC power converter, in the example PFC power converter 200 shown in FIG. 2A, comparable to the multi-stage conventional PFC power converter circuit architectures. The power factor of the PFC power converter 200 also could be substantially greater than 0.9, approaching 0.95 or more in other examples.

The PFC power converter 200 circuit architecture shown in FIG. 2A shows a half bridge embodiment of the switching bridge stage 210, although in other example PFC power converters, the switching bridge stage 210 could be replaced with a full bridge stage without exceeding the scope of this disclosure. The switching bridge stage 210 includes two MOSFETs 214, 216 in the example shown in FIG. 2A although it could also include other types of switches. The MOSFETs 214, 216 convert the rectified input power in the form of the rectified input voltage received from the input bridge stage 208 and couple the energy to the $DC_{OUT}$ 204 of the PFC power converter 200 through a transformer, such as the isolation transformer 218 shown in FIG. 2A. The transformer 218 has a primary winding 219 and a secondary winding 221. The input bridge stage 208 produces a rectified input bridge stage voltage 220 that is supplied to the switching bridge stage 210. The rectified input bridge stage voltage 220 is rectified from the sine wave input of the input bridge stage 208.

The PFC power converter 200 shown in FIG. 2A has an input capacitor 222 and a sense resistor 226 electrically coupled between the input bridge stage 208 and the switching bridge stage 210. The input capacitor 222 has a small enough value to filter out the ripples generated by the high frequency switching of the MOSFETs 214, 216 of the switching bridge stage 210 and to produce minimal distortion to the rectified low frequency sine wave voltage $V_{PIN}$ 220. The sense resistor 226 senses the current from the input bridge stage 208 and the reflected current reflected from the secondary side of the transformer 218 back to the primary side of the transformer 218, which is further explained below.

The switching bridge stage 210 can operate in an LLC control mode wherein the switching frequency is adjusted within an operating range to change the voltage gain to correct the changes in $DC_{OUT}$ 204, and also force the input current $I_{PIN}$ 217 to follow the rectified sine wave shape of $V_{PIN}$ 220. Leakage inductance of the transformer 210, and the inductance of primary winding 219 provides the inductance values for the LLC control mode and a resonance capacitor 223 provides the capacitance value for the LLC resonance circuit. When the switching bridge stage 210 operates in the LLC control mode, the MOSFETs 214, 216 are turned on at near 50% duty, i.e. the full 50% duty less a pre-determined dead time. The output of the switching bridge stage 210 is regulated by changing the switching frequency of the MOSFETs 214, 216. The PFC control circuit 212 operates in a way such that it produces a reference waveform that is proportional to the rectified AC voltage waveform $V_{PIN}$ 220 with a variable amplitude. The amplitude of the reference waveform is adjustable and is determined by the regulation circuit that provides a feedback loop from $DC_{OUT}$ 204 back to the PFC control circuit 212.

The PFC control circuit 212 senses the current that is flowing through the switching bridge stage 210 through the sense resistor 226, in the example PFC power converter 200 shown in FIG. 2A, but the PFC control circuit 212 can sense the current in any other suitable manner. The PFC control circuit 212 controls the switching operation of the MOSFETs 214, 216, which forces the sensed current received by the switching bridge stage 210 to follow the rectified sine shape reference waveform to keep the input current $I_{PIN}$ 217 of the switching bridge stage 210 following the sine wave profile and to be in phase with the input voltage $V_{PIN}$ 220 of the switching bridge stage 210.

In the process of controlling the profile of the input current to follow the rectified sine shape reference waveform, the LLC control mode of the switching bridge stage 210 also adjusts the voltage gain of the PFC power converter 200 by varying the switching frequency of the MOSFETs 214, 216, or other switches in alternative circuit architectures.

The LLC control mode of the switching bridge stage 210 has an intrinsic advantage when it operates specifically at zero voltage soft switching mode for the MOSFETs 214, 216, which produces high power efficiency because the energy loss during switching of the MOSFETs 214, 216 is low. The signal rectified from the secondary winding 221 of the transformer 218 charges an output capacitor 228, which causes the output capacitor 228 to hold the output voltage, $V_{OUT}$ 230. The amplitude of the voltage from the secondary winding 221 of the transformer 218 is greater than the $V_{OUT}$ 230 to generate a current and enable the profile of the sensed current, $I_{PIN}$, received by the switching bridge stage 210 to follow the sine shape reference waveform.

When the voltage of $V_{IN}$ 206 is near the zero voltage crossing region, the voltage gain of the LLC control mode of the switching bridge stage 210 may not be large enough to generate sufficient output voltage from the transformer 218 to maintain the desired current flow. However, this limitation only minimally affects the power factor, and with proper transformer design and voltage gain setting, such distortion to the sine wave shape of the $I_{PIN}$ 217 is not significant and a power factor of 0.9 or greater can be achieved in many applications.

In some examples, as shown in FIG. 2A, a boost capacitor 232 is used to boost the output voltage from the secondary winding 221 of the transformer 218 by resonance effect with the inductance of the transformer secondary winding 221. Such boost effect further increases the total voltage gain of the PFC power converter 200. Further, the transformer 218 has energy losses along with other circuit components having energy losses that generate some current and help to fill the valley region of the rectified sine wave shape. Because of the boost factor and the generated current from the PFC power converter's 200 energy loss, the input current to the switching bridge stage 210 is maintained close to an ideal sine wave shape and the power factor of the PFC power converter 200 can be maintained at 0.9 or greater.

The PFC power converter 200 shown in FIG. 2A also has two diodes 234, 236 that serve as one way switches that allow current to flow from the secondary winding 221 of the transformer 218 to the $DC_{OUT}$ 204. The diodes 234, 236 in the example shown in FIG. 2A are rectifier diodes and are arranged to ensure power from the secondary winding 221 is fed to the output capacitor 228 irrespective of which of switches 214, 216 are on.

Figure 2B:
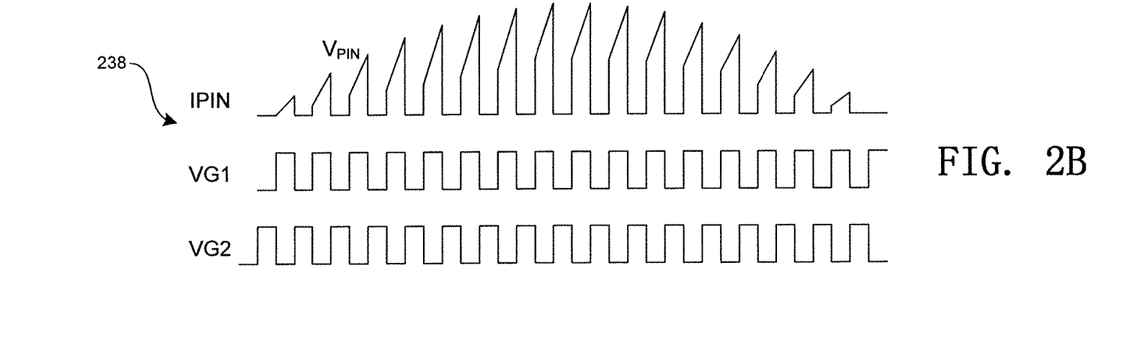

The operating waveforms of $I_{PIN}$ 217 and $V_{PIN}$ 220, $V_{G1}$, and $V_{G2}$ are shown in FIG. 2B. The control voltages of $V_{G1}$ 213 and $V_{G2}$ 215 are arranged so that switches 214, 216 are not both simultaneously closed. The input voltage, $V_{PIN}$ 220, or rectified input bridge stage voltage, has a waveform that follows the switching bridge stage 210 current, $I_{PIN}$ 217, as illustrated by the waveforms 238 shown in FIG. 2B.

Figure 3A:
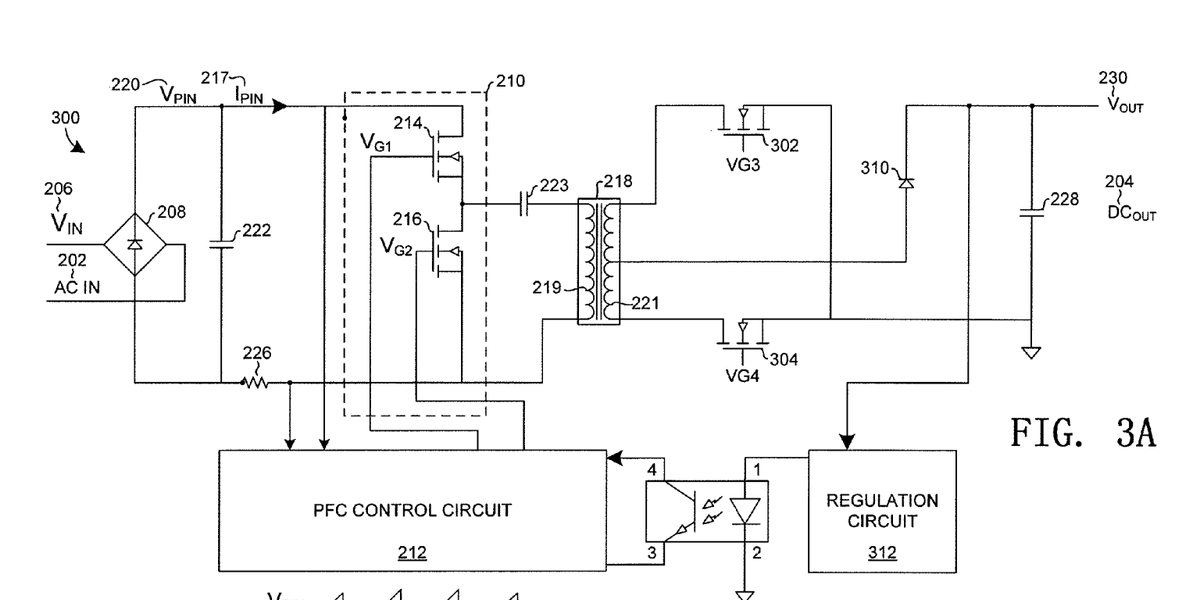
FIG. 3A is a schematic of another example of a high efficiency PFC power converter and FIG. 3B shows its associated operating waveforms, in accordance with aspects of the disclosure.

Referring now to FIG. 3A, another embodiment of the disclosed high efficiency PFC power converter 300 is shown with similar circuit architecture to the PFC power converter 200 shown in FIG. 2 except that the secondary side diodes 234, 236 from FIG. 2A are replaced with controllable MOSFETs 302, 304. In many operating circumstances where the primary side 219 of the transformer 218 operates in the LLC control mode, the input current $I_{PIN}$ 217 follows the sine wave shape of the input voltage $V_{PIN}$ 220 and MOSFETs 302, 304 operate in a synchronous rectification mode. The MOSFETs 302, 304 turn on and off synchronously with their corresponding primary side MOSFETs 214, 216, which means that the secondary side MOSFETs 302, 304 act like the rectifier diodes 234, 236 of FIG. 2A, but with a lower conduction drop. At the valley region of $V_{PIN}$ 220, when the LLC control mode cannot generate enough voltage from the secondary winding 221 to keep the $I_{PIN}$ flow, MOSFETs 302, 304 operate in a boost mode that makes use of leakage inductance of the secondary winding 218 of the transformer 218 to generate a boost current, as shown by the operating waveforms 310 shown in FIG. 3B.

Figure 3B:
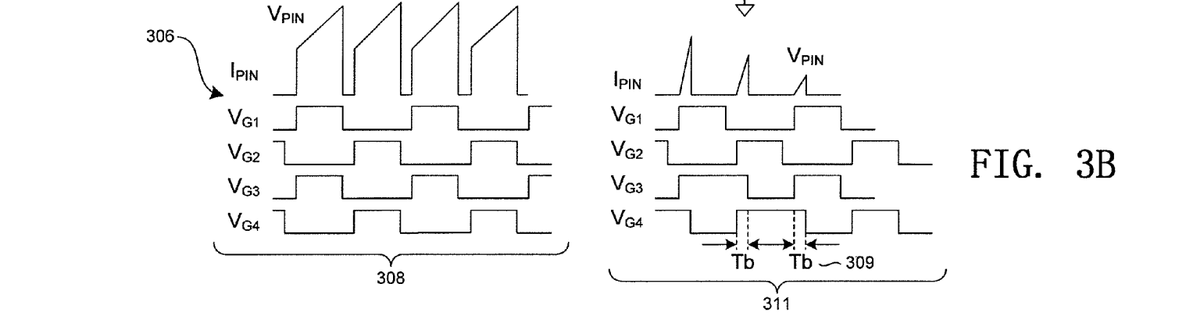

When the MOSFETs 302, 304 act as rectifier diodes in synchronous rectification mode, the operating waveforms 308 of $I_{PIN}$, $V_{G1}$, and $V_{G2}$ are similar in shape to the corresponding operating waveforms 238 of $I_{PIN}$, $V_{G1}$, and $V_{G2}$, as shown in FIG. 2B. However, at the valley region of $V_{PIN}$, the MOSFETs 302, 304 operate in the boost mode, which creates a boost period 309, during which both MOSFETs 302, 304 are on for a period when either primary side MOSFET 214 or MOSFET 216 is also on, whichever one is actively on at that time.

In operation away from the valley region, as shown by waveforms 308, MOSFET 302 and MOSFET 304 turn on and off alternatively in synchronous with the switching operation of MOSFET 214 and MOSFET 216. Only one of MOSFET 214 and MOSFET 216 are actively on at any given time. In the valley region of the $V_{PIN}$ signal, as shown by waveforms 311, both MOSFETs 302, 304 are turned on simultaneously for a boost period, Tb, for a portion of the on period of MOSFET 214, and similarly for a portion of the on period of MOSFET 216, whichever MOSFET is actively turned on.

When either of MOSFETs 302 and 304 are active in the valley region of the $V_{PIN}$ waveform, an active voltage exists in the secondary winding 221 of the transformer 218. The active voltage in the secondary winding 221 generates a boost current through the leakage inductance of the secondary winding 221 during this boost period, Tb 309. The boost current builds until either MOSFET 302 or MOSFET 304, whichever is active, is turned off, at which time the boost current is delivered to the $DC_{OUT}$ 204 through diode 310.

During the boost period, Tb 309, the boost current also is reflected to the primary side of the transformer 218 through mutual inductance of the primary winding 219 and the secondary winding 221. The boost current is sensed by the sense resistor 226 and causes the waveform of the sensed reflected current (the boost current) to have a magnitude that equals the magnitude of the reference current, $I_{PIN}$ 217, until either MOSFET 302 or MOSFET 304, whichever is actively on, is turned off.

Diode 310 is electrically coupled to the secondary winding 221 of the transformer 218 so that when MOSFET 302 and MOSFET 304 are turned off, the boost current that was established in the secondary winding 221 diverges to the diode 310. The diverged boost current charges the output capacitor 228 and generates the output energy $DC_{OUT}$ 204. An output voltage, $V_{OUT}$ 230, of the output energy, $DC_{OUT}$ 204, is directly related to the amplitude of the voltage from the secondary winding 221, which is regulated by the switching on of the secondary side MOSFETs 302, 304 synchronously with the primary side MOSFETs 214, 216 controlled by the PFC control circuit 212. The regulation circuit 312 of the output voltage, $V_{OUT}$ 230, closes the voltage control loop that determines the amplitude of the input voltage, $V_{IN}$ 206. Further the LLC operation of the primary side MOSFETs 214, 216 change the switching frequency of the MOSFETs 214, 216 to force the rectified AC bridge stage current, $I_{PIN}$ 217, to follow the shape of the input, $V_{PIN}$ 206.

A regulation circuit 312 is electrically coupled to the PFC control circuit 212. The PFC control circuit 212 adjusts the voltage gain of the PFC power converter by varying the switching frequency of the primary side MOSFETs 214, 216, which control the secondary winding 221 voltage, the behavior of the secondary side switches, MOSFETs 302, 304 and thus the energy output $DC_{OUT}$ 204. Therefore, the switching frequency of the primary side MOSFETs 214, 216 controls the overall voltage gain (the DC/DC conversion capabilities) of the PFC power converter 300. Thus, the PFC control circuit 212 controls both the voltage gain and the waveform correction (PFC) in a single stage.

Figure 4A:
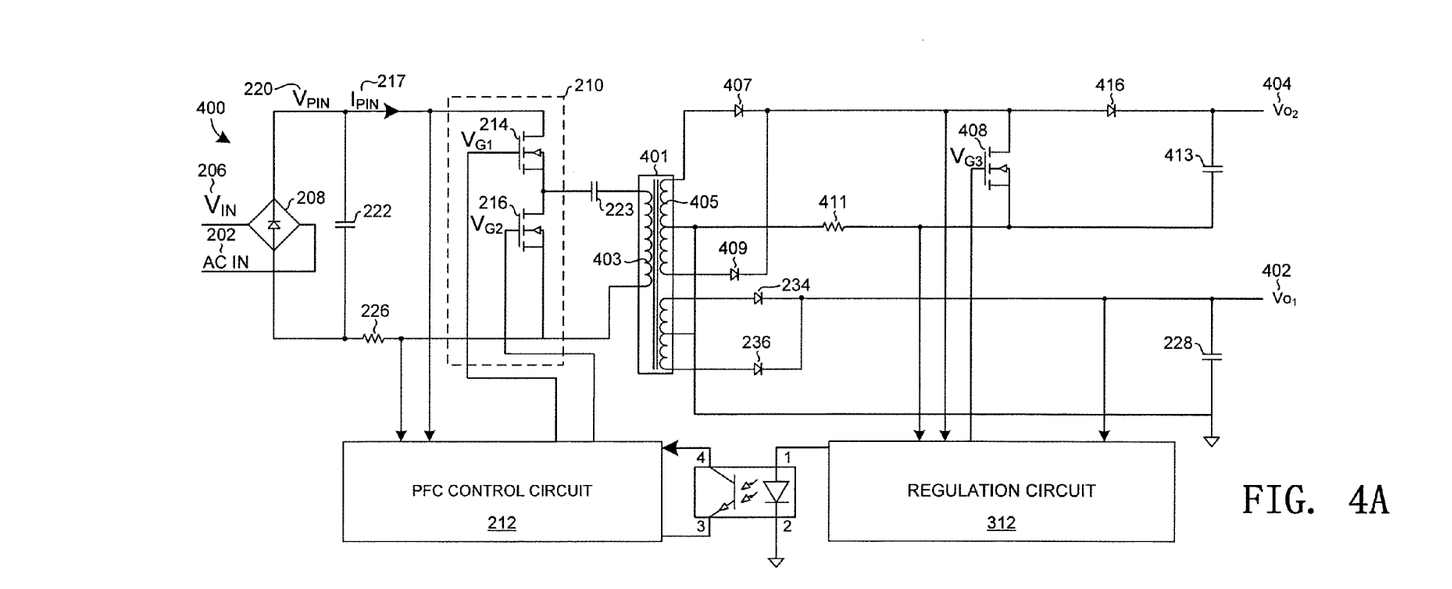
FIG. 4A is schematic of yet another example high efficiency PFC power converter and FIG. 4B shows its associated operating waveforms, according to aspects of the disclosure.

FIG. 4A shows another embodiment of the disclosed PFC power converter 400 with an integrated PFC function that drives two regulated outputs 402, 404. The primary side of the PFC power converter 400 is the same circuit architecture as the primary side of the example PFC power converters 200, 300 shown in FIGS. 2A and 3A. The secondary side of the PFC power converter 400 is different than the examples in FIGS. 2A and 3A in that there are two regulated outputs 402, 404 and associated circuit architecture for each output 402, 404. The regulation of the first output 402 is done in the same manner as the PFC power converter 200 shown in FIG. 2A in which the LLC mode of operation for the primary side MOSFETs 214, 216 changes the switching frequency of the MOSFETs 214, 216 so as to control the output voltage to meet a reference, while at the same time forcing the input current 217 $I_{PIN}$ sensed by sense resistor 226 to follow the reference sine wave shape of $V_{PIN}$.

The PFC power converter 400 shown in FIG. 4A has a transformer 401 having a primary winding 403 and a secondary winding 405. The primary side switches, MOSFETs 214, 216, are electrically coupled to the primary winding 403, as shown in the example PFC power converters 200, 300 shown in FIGS. 2A and 3A. The PFC power converter 400 shown in FIG. 4A, however, also includes a boost switch, shown as the secondary side boost MOSFET 408 in FIG. 4A, that has an associated boost switch operating waveform $V_{G3}$ 408. The boost switch 408 is electrically coupled to the secondary winding 405 and both of the first output, $V_{O1}$ 402, and the second output $V_{O2}$ 404, of the PFC power converter 400. The boost MOSFET 408 (or other boost switch in alternative examples) is configured to turn on and off synchronously with the primary side MOSFETs 214, 216 and with controllable pulse width.

Figure 4B:
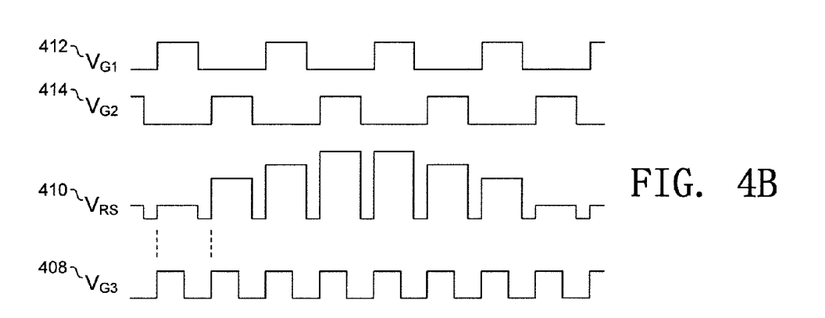

The regulation of the second output 404, however, is fulfilled by the boost MOSFET 408 shown in FIG. 4A, but it can be another type of boost switch in other example PFC power converters. The operating waveform of the boost MOSFET 408 is shown in FIG. 4B. In operation, the boost MOSFET 408 switches synchronously with the secondary side rectified voltage waveform $V_{RS}$ 410, which is naturally corresponding to the switching actions of the primary side MOSFETs 214, 216, as shown by the $V_{G1}$ and $V_{G2}$ waveforms 412, 414 in FIG. 4B. The secondary side rectified voltage $V_{RS}$ 410 is supplied to the second output, $V_{O2}$ 404 when the boost MOSFET 408 is turned off. When the boost MOSFET 408 is turned on, current builds up in the leakage inductance of the transformer 401. When the boost MOSFET 408 is turned off, the stored current and the leakage inductance create a boost energy that freewheels through diode 416 and is supplied to the second output, $V_{O2}$ 404. The boost MOSFET 408 waveform adjusts its pulse width to regulate the second output voltage, $V_{O2}$ 404.

The modulation control of the boost MOSFET 408 involves two levels—the regulation circuit 312 is electrically coupled to the second output, $V_{O2}$ 404, and determines the amplitude of the waveform shape of the boost MOSFET 408. The switching control of the boost MOSFET 408 controls the pulse width of the boost MOSFET 408 waveform to force the current sensed by the secondary side sense resistor 411 (also electrically coupled to the boost MOSFET 408) to follow the waveform of the input current 217 to the switching bridge stage 210. Because the waveform of the boost MOSFET 408 is regulated in this manner, the boost MOSFET 408 operation does not disturb the input current 217 and only increases the amplitude of the input current 217 without distorting the waveform of the input current 217.

A distortion can be purposely introduced to the operation of the boost MOSFET 408 to compensate a wave shape distortion at the valley region of the reference sine waveform of $V_{PIN}$ 220, if desired. As discussed above in regards to the PFC power converter 200 shown in FIG. 2A, the wave shape distortion may naturally occur at the valley region of the sine reference wave when the boost MOSFET 408 is off. Since the boost operation of the boost MOSFET 408 has good control of its current wave shape at a low voltage, a distortion can be purposely introduced in its current wave shape to offset the distortion resulting from the control of the second output voltage, $V_{O2}$ 404, which ultimately results in the matching of the total input current, $I_{PIN}$ 217, to the reference sine wave shape.

The concept of the boost MOSFET circuit configuration for the PFC power converter 400 shown in FIG. 4A can be extended to a PFC power converter with more than two outputs. In the examples with three or more outputs, the first output would be controlled in a manner similar to the first output of the examples shown in FIGS. 2A and 3A. The second and any additional outputs would be controlled in a manner similar to the second output of FIG. 4A, with a boost MOSFET.

Figure 5A:
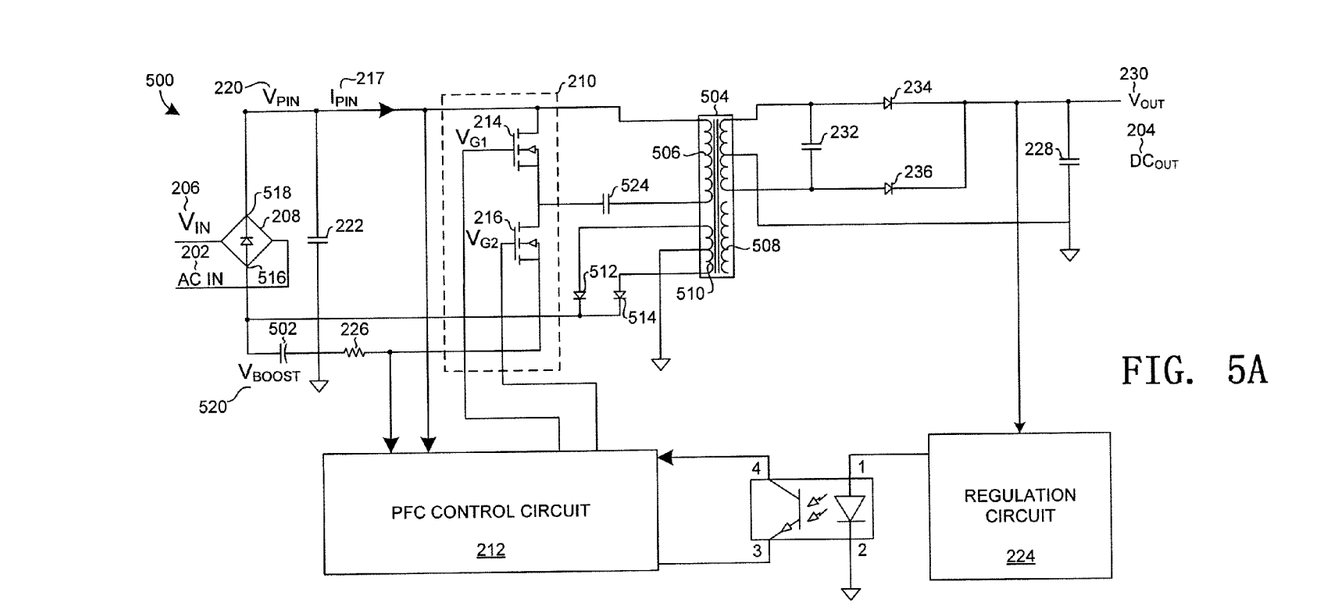
FIG. 5A is a schematic of an example self-boosted high efficiency PFC power converter and FIG. 5B shows its associated operating waveforms, in accordance with aspects of the disclosure.

FIG. 5A shows a schematic for a self-boosted PFC power converter 500. The primary side is similar to the PFC power converters 200, 300, 400 that are shown in FIGS. 2A, 3A, and 4A with the addition of a boost capacitor 502 that is electrically coupled between power ground and the negative terminal of the input bridge stage 208. The transformer 504 of the PFC power converter 500 shown in FIG. 5A includes a primary winding 506, a secondary winding 508, and a boost winding 510. Two primary side boost diodes 512, 514 are electrically coupled to the boost winding 510 and comprise a full wave rectifier that rectifies the voltage 520 from the boost winding 510 and charges the boost capacitor 502. The charged boost capacitor 502 causes the voltage across the input capacitor 222 to become the sum of the rectified AC input 202 and the offset voltage across the boost capacitor 502.

Figure 5B:
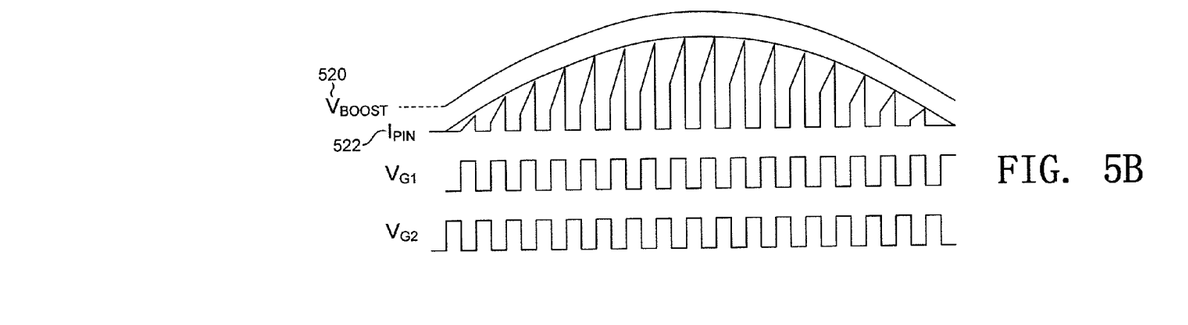

When the amplitude of the voltage 520 across the boost capacitor 502 reaches a boost threshold, sufficient voltage is generated in the secondary winding 508 of the transformer 506 by the switching operation of the primary side switches, MOSFETs 214, 216, even at the zero crossing point of the input voltage $V_{PIN}$ 220 to charge the output capacitor 228. Consequently, the input current, $I_{PIN}$ 217, is generated to correspond with input voltage $V_{PIN}$ throughout the cycle and its wave shape can follow the ideal rectified sine wave even at zero crossing region and therefore make the power factor greater than 0.9, and in some examples 0.95 or up to 1.0, as shown in the boost voltage 520 and input current waveforms 520, 522 of FIG. 5B. The boost voltage 520 of the boost capacitor 502 is shown placed on the negative output side of the input bridge stage 208, but can be placed on the positive output side of the input bridge stage 208 in alternative examples.

Figure 6A:
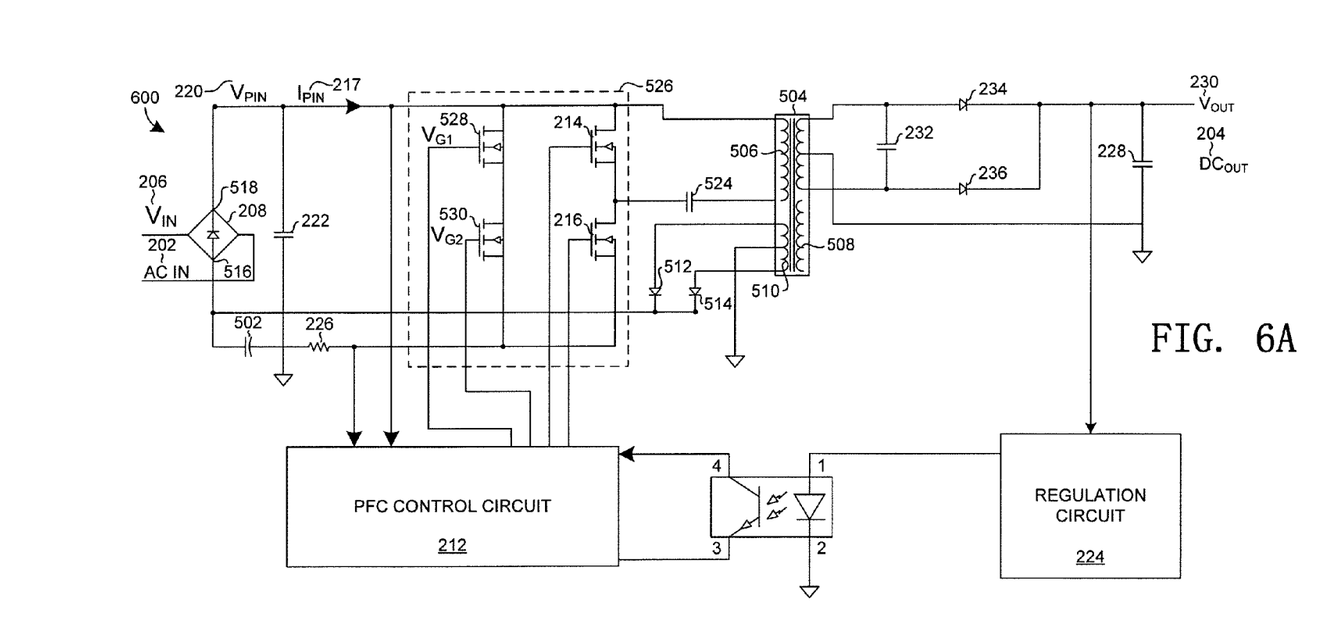
FIG. 6A is a schematic of another example of a self-boosted high efficiency PFC power converter and FIG. 6B shows its associated operating waveforms, in accordance with aspects of the disclosure.
Figure 6B:
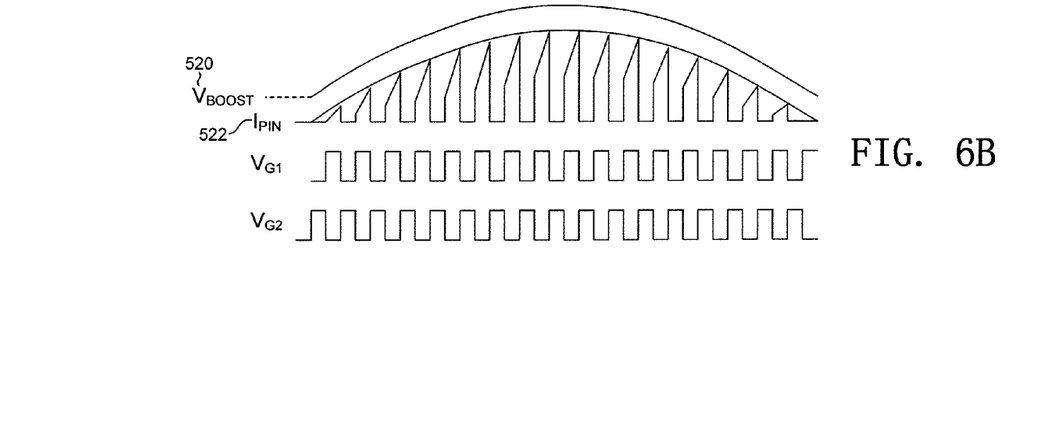

FIG. 6A shows the same self-boosted PFC power converter 500 shown in FIG. 5A with the only difference being that the switching bridge stage 526 is a full bridge stage compared to the half bridge stage shown in FIG. 5A. The full bridge switching bridge stage 526 has four MOSFETs 214, 216, 528, 530 that are electrically coupled to the primary winding 506 of the transformer 504. The primary resonance capacitor 524 is electrically coupled between the center point of the primary side MOSFET 214, 216 and the primary winding 506, and the other terminal of primary winding 506 is coupled to the center point of MOSFET 528, 530. Further, in the full bridge switching bridge stage 526, soft switching can be obtained with phase shifted control, a complementary switching control, or LLC control mode. LLC control mode has the ability to adjust the amplitude of the voltage with its operating frequency change, and results in less distortion in the current wave shape at the valley region of the rectified sine voltage compared to other control modes. In LLC mode operation, MOSFET 528 turns on and off in synchronous with MOSFET 216 and MOSFET 530 turns on and off in synchronous with MOSFET 214.

Having described and illustrated the principles of the invention in a preferred embodiment thereof, it should be apparent that the invention can be modified in arrangement and detail without departing from such principles. I claim all modifications and variations coming within the spirit and scope of the following claims.

The invention claimed is:

1. A power factor correction (PFC) power converter having a power factor, comprising:
   an input alternating current (AC) voltage supply configured to supply an input AC voltage that generates an input AC current having an input AC waveform;
   an input bridge rectifier stage configured to receive the input AC voltage and to produce a rectified input AC bridge stage voltage that generates a rectified AC bridge stage current having a rectified input AC bridge stage waveform; and
   a switching bridge stage having a control circuit that is configured to:
      sense the rectified AC bridge stage current;
      cause the rectified input AC bridge stage waveform to follow the input AC waveform;
      convert the rectified AC bridge stage voltage to a rectified direct current (DC) bridge stage voltage; and
      cause the power factor of the PFC power converter to be greater than 0.9.

2. The PFC power converter of claim 1, wherein the switching bridge stage is a half bridge circuit.

3. The PFC power converter of claim 1, wherein the switching bridge stage is a full bridge circuit.

4. The PFC power converter of claim 1, wherein the switching bridge stage operates in an LLC control mode, and wherein the switching bridge stage includes a first primary switch and a second primary switch each having a switching frequency.

5. The PFC power converter of claim 4, wherein in the LLC control mode, the first primary switch and the second primary switch are operating in zero voltage soft-switching mode.

6. The PFC power converter of claim 4, wherein the switching bridge stage control circuit causes the rectified input AC bridge stage waveform to follow the input AC waveform by adjusting the amplitude of a voltage gain of the switching bridge stage.

7. The PFC power converter of claim 6, wherein adjusting the voltage gain of the switching bridge stage is controlled by varying the switching frequency of the first primary switch and the second primary switch.

8. The PFC power converter of claim 6, further comprising:
   a transformer having a primary side and a secondary side related to each other by a transformer turns ratio, the transformer including:
      a primary winding, wherein the first primary switch and the second primary switch are electrically coupled to the primary winding on the primary side of the transformer; and
      a secondary winding;
   a first secondary switch and a second secondary switch electrically coupled to the secondary winding on the secondary side of the transformer, the first secondary switch and the second secondary switch configured to turn on when either the first primary switch is on or the second primary switch is on and cause an active voltage in the secondary winding when the rectified input AC bridge stage waveform is in a valley region.

9. The PFC power converter of claim 8, wherein the active voltage establishes a reflected current based on a leakage inductance of the secondary winding, the reflected current is reflected to the primary side based on the turns ratio of the transformer.

10. The PFC power converter of claim 9, wherein a sense resistor electrically coupled to the switching bridge stage senses the reflected current on the primary side of the transformer.

11. The PFC power converter of claim 10, wherein when the sensed reflected current has a magnitude that is equal to a magnitude of the input AC current, the first secondary switch or the second secondary switch, whichever is active, is turned off, and energy stored in the leakage inductance is delivered to an output of the PFC power converter.

12. The PFC power converter of claim 4, further comprising:
   a transformer having:
      a primary winding having a primary side and a secondary side related to each other by a transformer turns ratio, the first primary switch and the second primary switch are electrically coupled to the primary winding;
      a secondary winding;
      a first output electrically coupled to the secondary winding and having a first output voltage with a first output voltage waveform, the first output regulated by an output regulation circuit configured to cause the first output voltage waveform to follow the input AC waveform of the input AC current; and
      a second output electrically coupled to the secondary winding and having a second output voltage with a second output voltage waveform;
   a boost switch having a boost switch operating waveform and electrically coupled to the secondary winding and the second output, the output regulation circuit configured regulate the second output voltage by causing boost energy generated by boost current that builds in the leakage inductance of the secondary winding when the boost switch is turned on to drive the second output voltage when the boost switch is turned off, the boost energy generated by either the first primary switch or the second primary switch being turned on.

13. The PFC power converter of claim 1, further comprising a transformer having:
   a primary winding,
   a secondary winding, and
   a boost winding having a boost winding voltage;
   a boost capacitor electrically coupled to an output of the input bridge stage and an input of the switching bridge stage; and
   a rectifier configured to rectify the boost winding voltage and charge the boost capacitor to a boost capacitor voltage.

14. The PFC power converter of claim 13, wherein the boost capacitor is electrically coupled between power ground and the output of the input bridge stage.

15. The PFC power converter of claim 13, wherein the rectifier is a full wave rectifier.

* * * * *